United States Patent
Rajagopalan et al.

(10) Patent No.: US 12,299,636 B2
(45) Date of Patent: May 13, 2025

(54) DYNAMICALLY UPDATING APPLICATION COMPLIANCE POLICIES

(71) Applicant: Dell Products L.P., Round Rock, TX (US)

(72) Inventors: Srinivasa Ragavan Rajagopalan, Bangalore (IN); Ankit Kumar, Jharkhand (IN); Jyothi Bandakka, Bengaluru (IN); Andy Yiu, Lago Vista, TX (US); Ravi Vijaykumar Vanjani, Carrollton, TX (US)

(73) Assignee: Dell Products L.P., Round Rock, TX (US)

( * ) Notice: Subject to any disclaimer, the term of this patent is extended or adjusted under 35 U.S.C. 154(b) by 418 days.

(21) Appl. No.: 18/055,105

(22) Filed: Nov. 14, 2022

(65) Prior Publication Data

US 2024/0161061 A1 May 16, 2024

(51) Int. Cl.
*G06F 21/12* (2013.01)
*G06Q 10/10* (2023.01)

(52) U.S. Cl.
CPC ........ *G06Q 10/10* (2013.01); *G06F 21/121* (2013.01)

(58) Field of Classification Search
CPC ........ G06F 21/121; H04L 63/20; G06Q 10/10
See application file for complete search history.

(56) References Cited

U.S. PATENT DOCUMENTS

| | | | |
|---|---|---|---|
| 2013/0339284 A1* | 12/2013 | Rowles | G06Q 30/0202 706/46 |
| 2020/0089843 A1* | 3/2020 | Flores | H04L 41/0895 |
| 2023/0111056 A1* | 4/2023 | Decrop | G06F 8/62 717/171 |

* cited by examiner

*Primary Examiner* — Thaddeus J Plecha
(74) *Attorney, Agent, or Firm* — Kirton McConkie; Brian Tucker (57) ABSTRACT

Application compliance policies can be dynamically updated. An agent can be deployed on user computing devices to monitor application install events to track how frequently users install applications on the user computing devices and whether applicable application compliance policies dictate that such applications should be removed. A policy management service of a management solution can interface with the agents to gather application metrics and use the application metrics to dynamically update the application compliance policies to prevent future removal of one or more applications that are determined to be commonly installed by the users. These dynamic updates could be made on a per-user basis, a per-group basis, or a global basis.

20 Claims, 10 Drawing Sheets

DYNAMICALLY UPDATING APPLICATION COMPLIANCE POLICIES

CROSS-REFERENCE TO RELATED APPLICATIONS

N/A

BACKGROUND

Many organizations use a management solution to manage user computing devices, such as desktop or laptops that their employees use. For example, an administrator may use the management solution to define and apply policies, such as application compliance policies, to the user computing devices. An application compliance policy is used to define which applications should be installed on and/or removed from a user computing device to which the policy applies. For example, an administrator could define an application compliance policy that includes a list of applications that should be automatically installed on a user computing device and a list of applications that should be removed from the user computing device if the user installs them.

When an application compliance policy applies to a user computing device, it can cause frustration for the user and may decrease the user's productivity. For example, a user may desire to use an application that is not automatically installed under the applicable application compliance policy. In such a case, the user may install the application, use it, and then later find out that the application has been removed in accordance with the application compliance policy. The user would therefore be forced to reinstall the application anytime he or she wants to use it. To avoid this, the user would need to inform the administrator who in turn would have to manually update the application compliance policy. Yet, this is a tedious and error prone process.

BRIEF SUMMARY

The present invention extends to systems, methods and computer program products for dynamically updating application compliance policies. An agent can be deployed on user computing devices to monitor application install events to track how frequently users install applications on the user computing devices and whether applicable application compliance policies dictate that such applications should be removed. A policy management service of a management solution can interface with the agents to gather application metrics and use the application metrics to dynamically update the application compliance policies to prevent future removal of one or more applications that are determined to be commonly installed by the users. These dynamic updates could be made on a per-user basis, a per-group basis, or a global basis.

In some embodiments, the present invention is implemented as a method for dynamically updating application compliance policies. A number of times a user has installed an application on a first user computing device can be tracked. In response to the tracking, it can be determined that the user has installed the application a threshold number of times. Application metrics can be sent to a policy recommendation service. The application metrics can indicate that the user installed the application on the first user computing device the threshold number of times. The policy recommendation service can generate a recommendation to exclude the application from a remove list of an application compliance policy based on the application metrics received from the first user computing device. In response to the recommendation, the application compliance policy that excludes the application from the remove list can be deployed to the first user computing device to thereby prevent removal of the application from the first user computing device when the user installs the application.

In some embodiments, the present invention is implemented as computer storage media storing computer executable instructions which when executed implement a method for dynamically updating application compliance policies. A policy recommendation service can receive application metrics from a plurality of user computing devices. The application metrics can indicate that an application has been installed a threshold number of times on the plurality of user computing devices. The policy recommendation service can evaluate the application metrics received from the plurality of user computing devices to generate a recommendation to remove the application from a remove list of an application compliance policy. Based on the recommendation, the application compliance policy can be updated to remove the application from the remove list. The updated application compliance policy can then be deployed to at least some of the plurality of user computing devices to thereby prevent the application from being removed from the at least some of the plurality of user computing devices.

In some embodiments, the present invention is implemented as a system that includes a management solution having a policy management service and a policy recommendation service, and a plurality of user computing devices having a telemetry service. The telemetry service is configured to track a number of times a user has installed an application on the respective user computing device to determine that the user has installed the application a threshold number of times and send application metrics to the policy recommendation service indicating that the user installed the application the threshold number of times. The policy recommendation service is configured to generate a recommendation to exclude the application from a remove list of an application compliance policy based on the application metrics received from the telemetry service on the plurality of user computing devices. The policy management service is configured to deploy the application compliance policy that excludes the application from the remove list to one or more of the user computing devices to thereby prevent removal of the application from the one or more user computing devices when the respective user installs the application.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
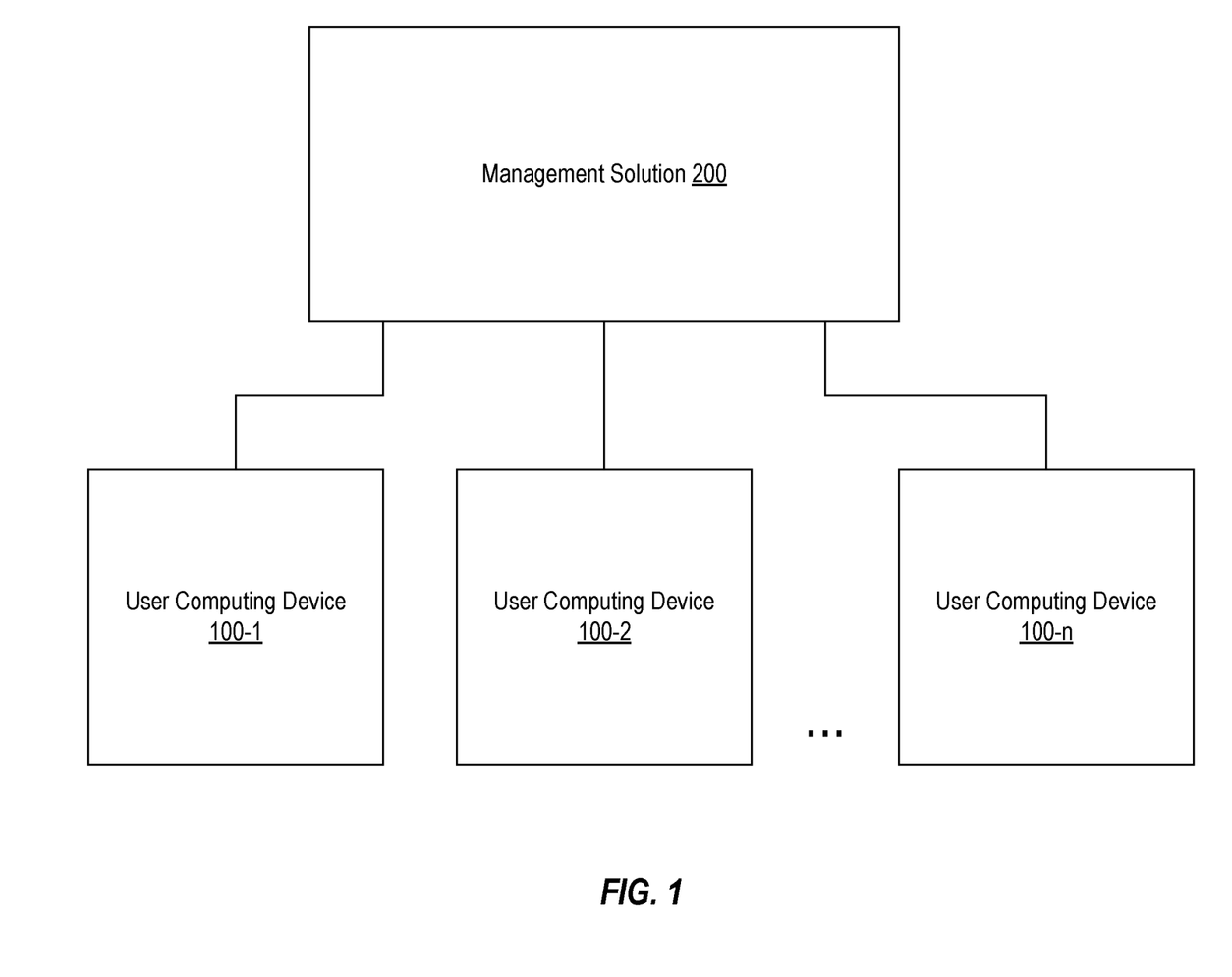
FIG. 1 represents an example computing environment in which embodiments of the present invention may be implemented.

FIG. 1 provides an example of a computing environment in which embodiments of the present invention may be implemented. This computing environment includes a plurality of user computing devices 100-1 through 100-n (generally and collectively user computing device(s) 100) and a management solution 200. User computing devices 100 can represent desktops, laptops, thin clients, tablets, smart phones, or other computing devices that may be managed. Management solution 200 can represent any arrangement of server computing components. For example, management solution 200 could be implemented in a public or private cloud or on a standalone server computing device. Management solution 200 allows an administrator to manage user computing devices 100.

Figure 2:
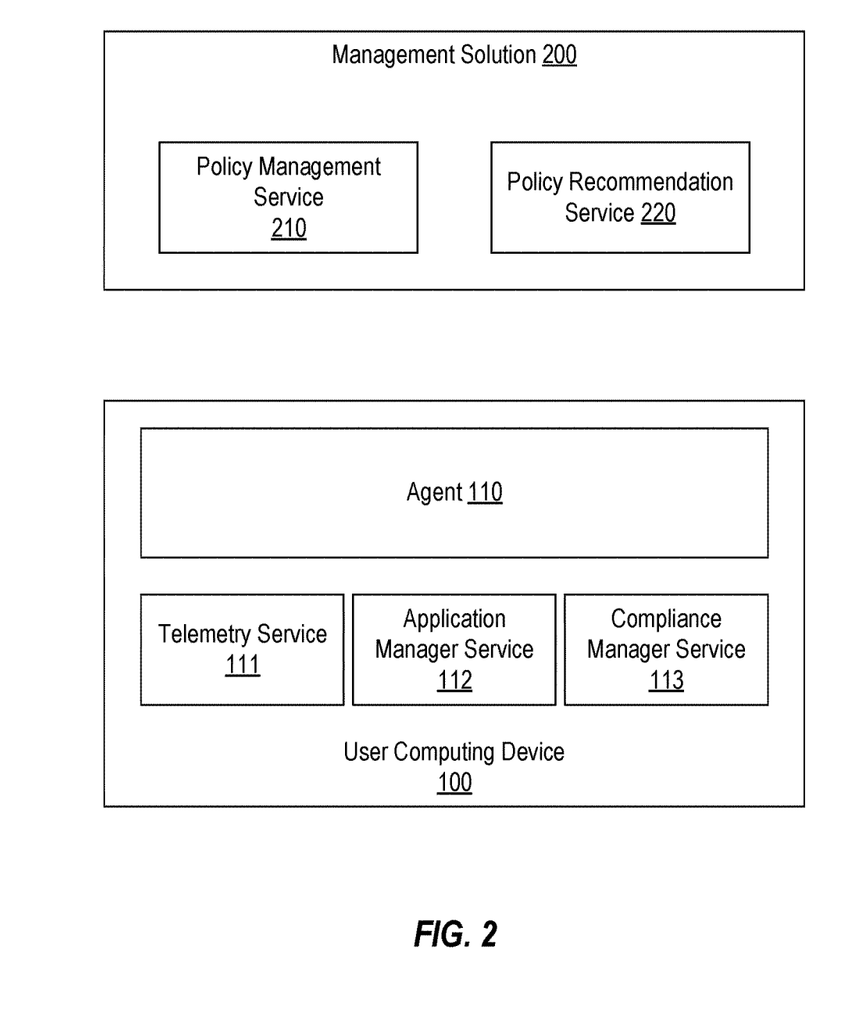
FIG. 2 provides an example of components that may be used on a user computing device and a management solution when one or more embodiments of the present invention are implemented.

FIG. 2 provides an example of components that may be included on a user computing device 100 and on management solution 200 to enable embodiments of the present invention to be implemented. User computing device 100 may include an agent 110, a telemetry service 111, an application manager service 112, and a compliance manager service 113. Management solution 200 may include a policy management service 210 and a policy recommendation service 220.

Telemetry service 111 can be configured to monitor the installation and removal of applications on user computing device 100 including applications that are installed or removed from management solution 200 and applications that the user installs or removes. Telemetry service 111 can also be configured to collect data about these applications such as digital signatures, crash reports, usage patterns, compatibility, etc. Telemetry service 111 can provide these "application metrics" to agent 110 which in turn can provide them to policy recommendation service 220.

Application manager service 112 can be configured to install and remove applications on user computing device 100 in accordance with an application compliance policy. For example, application manager service 112 can evaluate the application compliance policy to install any application that is included in an install list and to remove any application that is in a remove list.

Compliance manager service 113 can be configured to retrieve and deploy application compliance policies on user computing device 100. For example, compliance manager service 113 may interface with policy management service 210 to retrieve one or more application compliance policies that are applicable to user computing device 100 and/or to a user that is logged in to user computing device 100.

Policy management service 210 enables an administrator to configure application compliance policies for user computing devices 100. For example, an administrator could interface with policy management service 210 to define which applications should be installed on and/or removed from a particular user computing device 100, a particular group of user computing devices 100, or all user computing devices 100 that the administrator may manage (e.g., user computing devices 100 pertaining to an enterprise or other entity).

Policy recommendation service 220 can be configured to analyze the application metrics it receives from one or more user computing devices 100 to determine whether and/or how to update any application compliance policies. Policy recommendation service 220 may also be configured to present recommended updates to policy management service 210. Policy management service 210 may automatically apply such updates (including to create new application compliance policies) and/or may present updated/new application compliance policies to the administrator for approval.

Figure 3A:
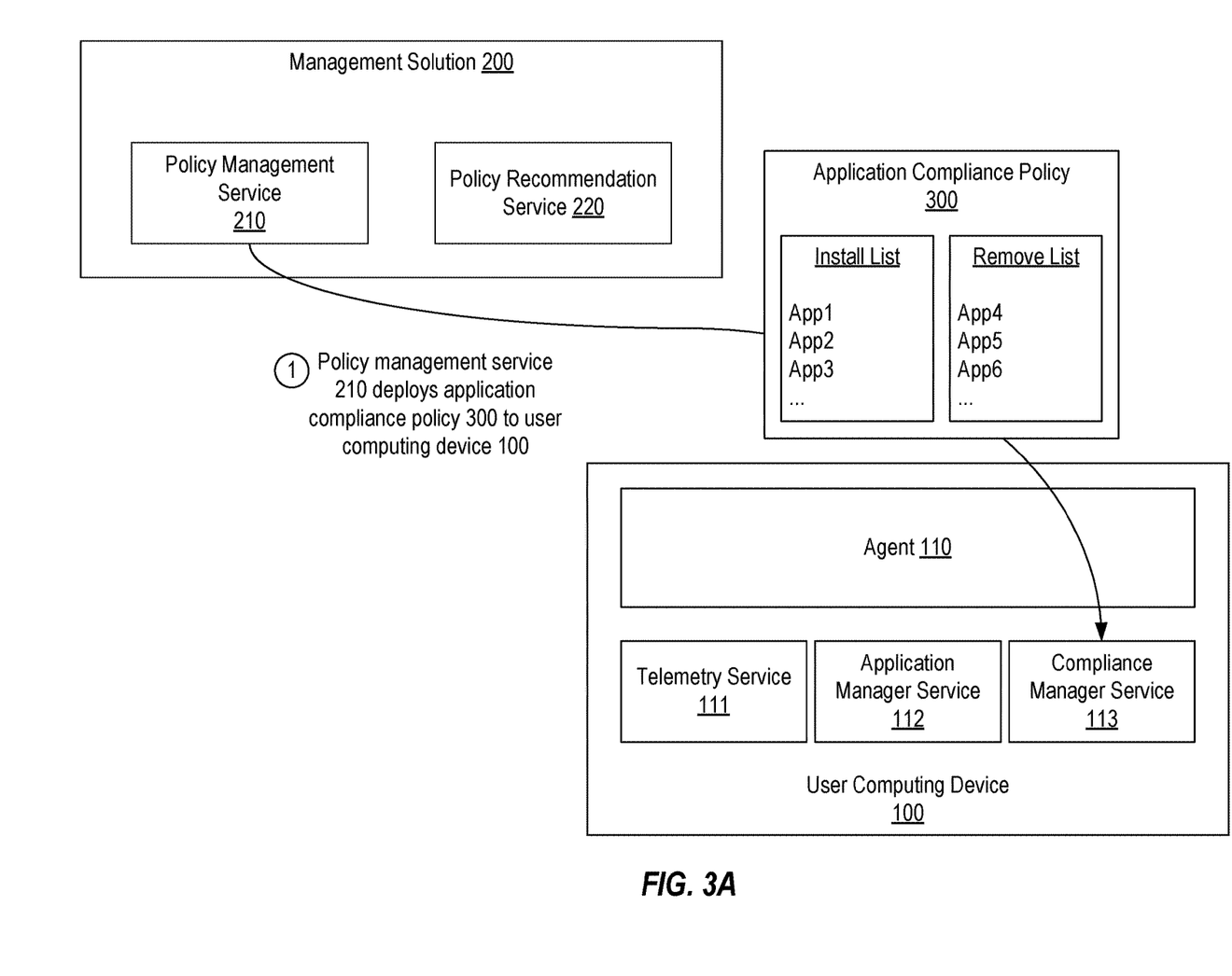
FIGS. 3A-3H provide an example of how application compliance policies may be dynamically updated in accordance with one or more embodiments of the present invention.

FIGS. 3A-3H provide an example of how application compliance policies can be dynamically updated in accordance with embodiments of the present invention. Turning to FIG. 3A, it is assumed that an administrator has used policy management service 210 to define an application compliance policy 300 that includes an install list and a remove list. The install list identifies applications that are to be installed on user computing device 100 including App1, App2, App3, etc. The remove list identifies applications that are to be removed from user computing device 100 if they happen to be installed including App4, App5, App6, etc. It is also assumed that the administrator has configured application compliance policy 300 to be applicable to all user computing devices 100 that the administrator manages such as all of an enterprise's user computing devices (i.e., global applicability). However, application compliance policy 300 could be applicable to only one or more groups of user computing devices 100 (e.g., user computing devices 100 that users on a management team, sales team, accounting team, etc. use) or to specific user computing device(s) 100.

In step 1, policy management service 210 can deploy application compliance policy 300 to user computing devices 100 to which it is applicable by sending application compliance policy 300 to compliance manager service 113.

Although not shown in the figures, in response to step 1, compliance manager service 113 can provide application compliance policy 300 to application manager service 112 to thereby allow application manager service 112 to install each application in application compliance policy 300, if not already installed. In some embodiments, application manager service 112 can interface with management solution 200 to obtain the applications to be installed and then install them, and these applications could be deployed in any form including as native applications or within a container (e.g., a virtual machine, Docker container, a sandbox, etc.).

Figure 3B:
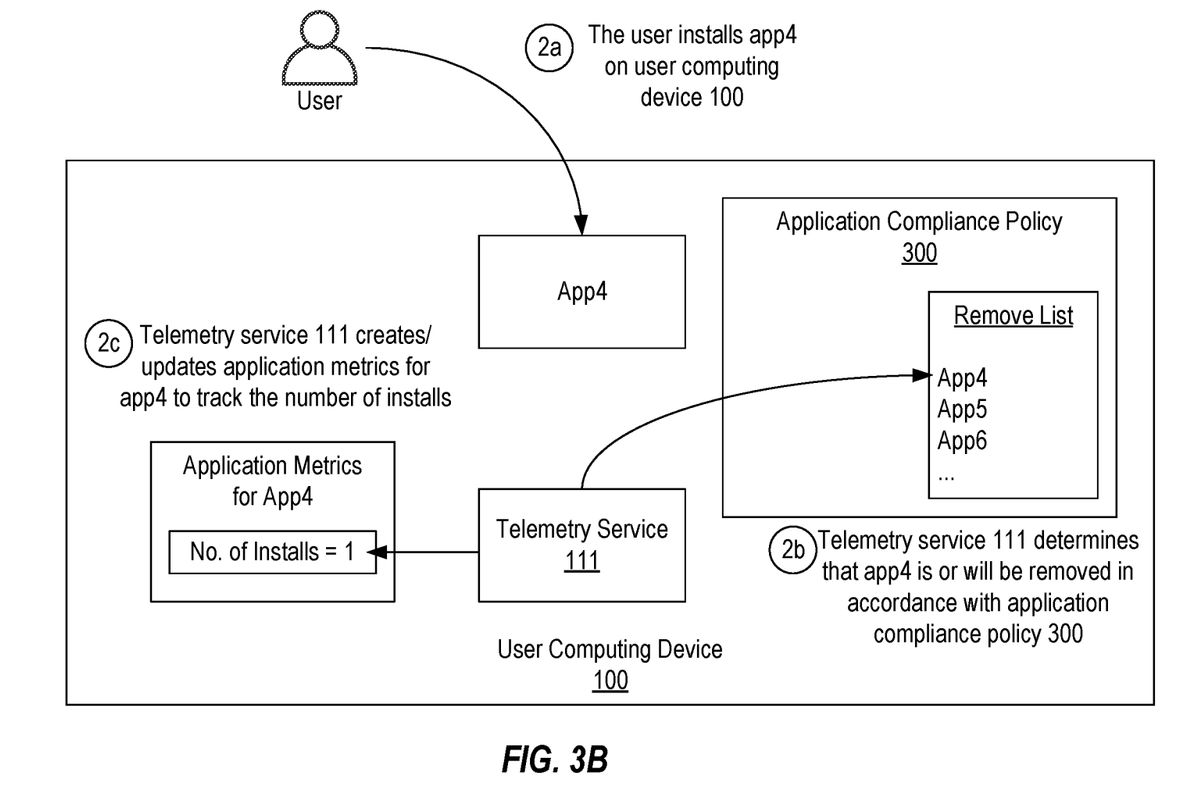

Turning to FIG. 3B, in step 2a, it is assumed that the user installs app4 on user computing device 100. For example, app4 can be an application that the user prefers using for a job-related task. In step 2b, telemetry service 111 can determine that app4 is or will be removed from user computing device 100 in accordance with application compliance policy 300. In step 2c, telemetry service 111 can create or update application metrics for app4 to track the number of times app4 has been installed on user computing device 100. Accordingly, telemetry service 111 can monitor how many times a user installs an application that is included in a remove list of application compliance policy 300. Additionally, as app4 runs on user computing device 100, telemetry service 111 may monitor app4 to determine additional application metrics such as usage patterns (i.e., how or when the user uses app4), information about any crashes of app4 (e.g., a crash report), exploits or other vulnerabilities of app4, a digital signature of app4, etc.

Although not shown in FIG. 3B, application manager service 112 can determine that app4 is included in the remove list in application compliance policy 300 and remove it from user computing device 100. Therefore, steps 2a-2c can be repeated whenever the user desires to use app4.

Figure 3C:
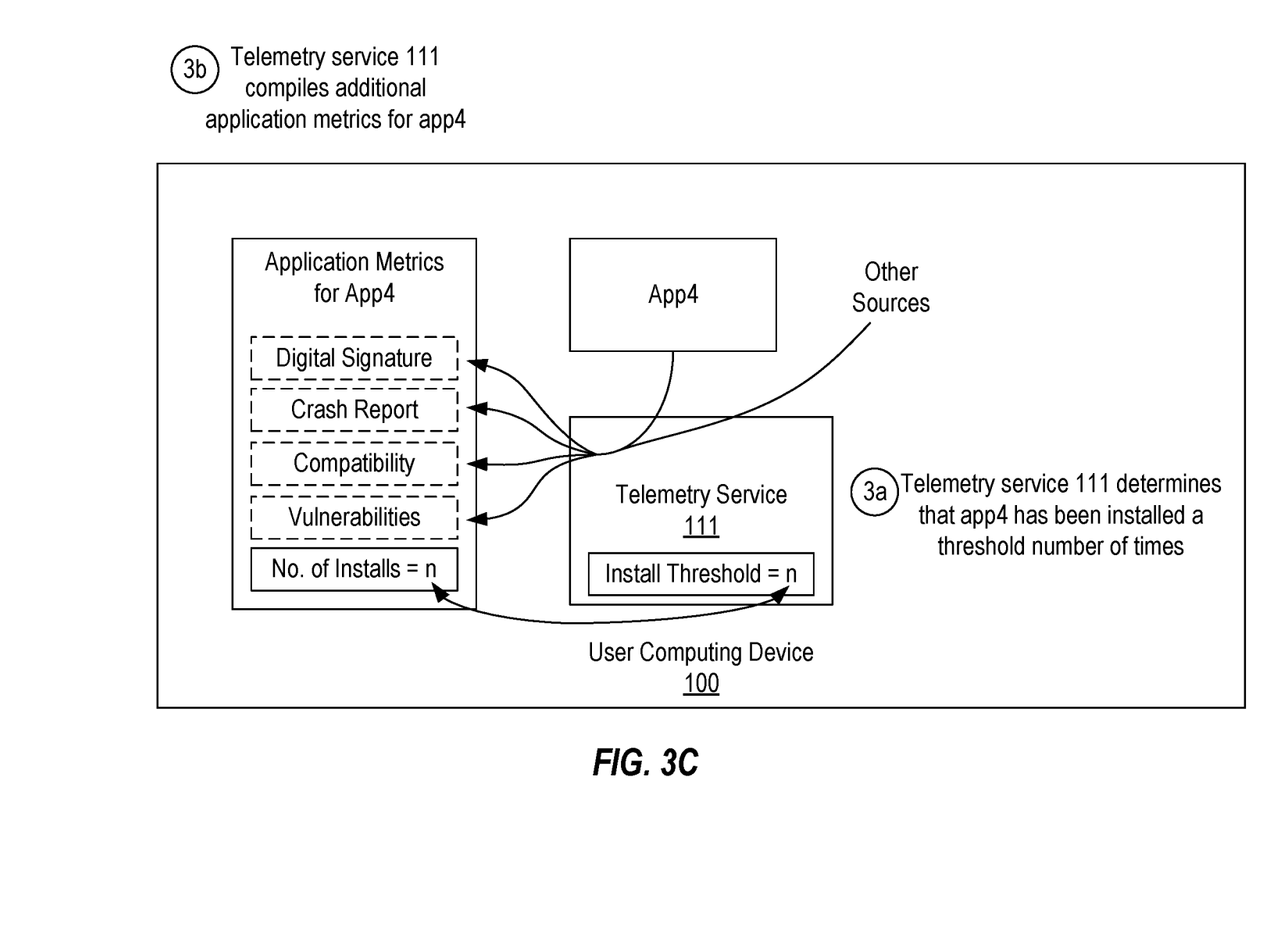

Turning to FIG. 3C, it is now assumed that the user has repeatedly installed app4 on user computing device 100. In step 3a, telemetry service 111 can determine that app4 has been installed a threshold number of times (e.g., more than 10 times). In step 3b, telemetry service 111 may compile additional application metrics for app4. Although telemetry service 111 is represented as compiling additional application metrics after determining that app4 has been installed the threshold number of times, telemetry service 111 could compile application metrics at any time. As represented in FIG. 3C, telemetry service 111 could evaluate app4 to determine its digital signature and could analyze app4 and/or interface with other sources to determine crash information, compatibility issues, vulnerabilities, etc. of app4. Regardless of when telemetry service 111 compiles each type of application metric for app4, after the user has installed app4 the threshold number of times, telemetry service 111 will have compiled application metrics that it can share with policy recommendation service 220.

Figure 3D:
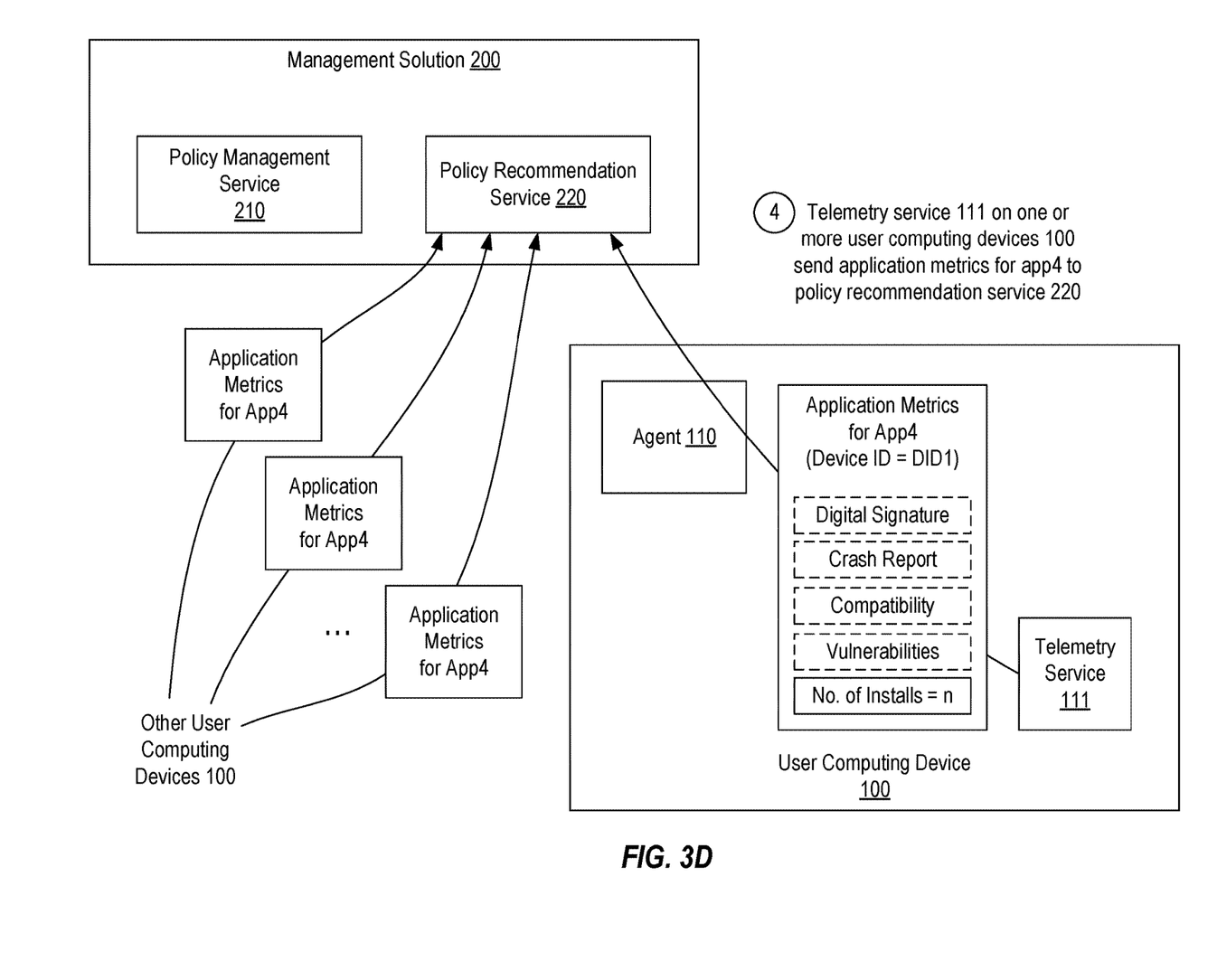

Turning to FIG. 3D, in step 4, telemetry service 111 can send the application metrics for app4 to policy recommendation service 220. As shown, application metrics for app4 may also be sent from other user computing devices 100 on which app4 had been repeatedly installed by their respective users (e.g., steps 2a-3b could be performed on any user computing device 100 on which app4 is repeatedly installed). Policy recommendation service 220 could receive these application metrics for app4 from the various user computing devices 100 over a period of time. The application metrics may also identify the user computing device 100 and/or the user of the user computing device 100 to which they pertain.

Figure 3E:
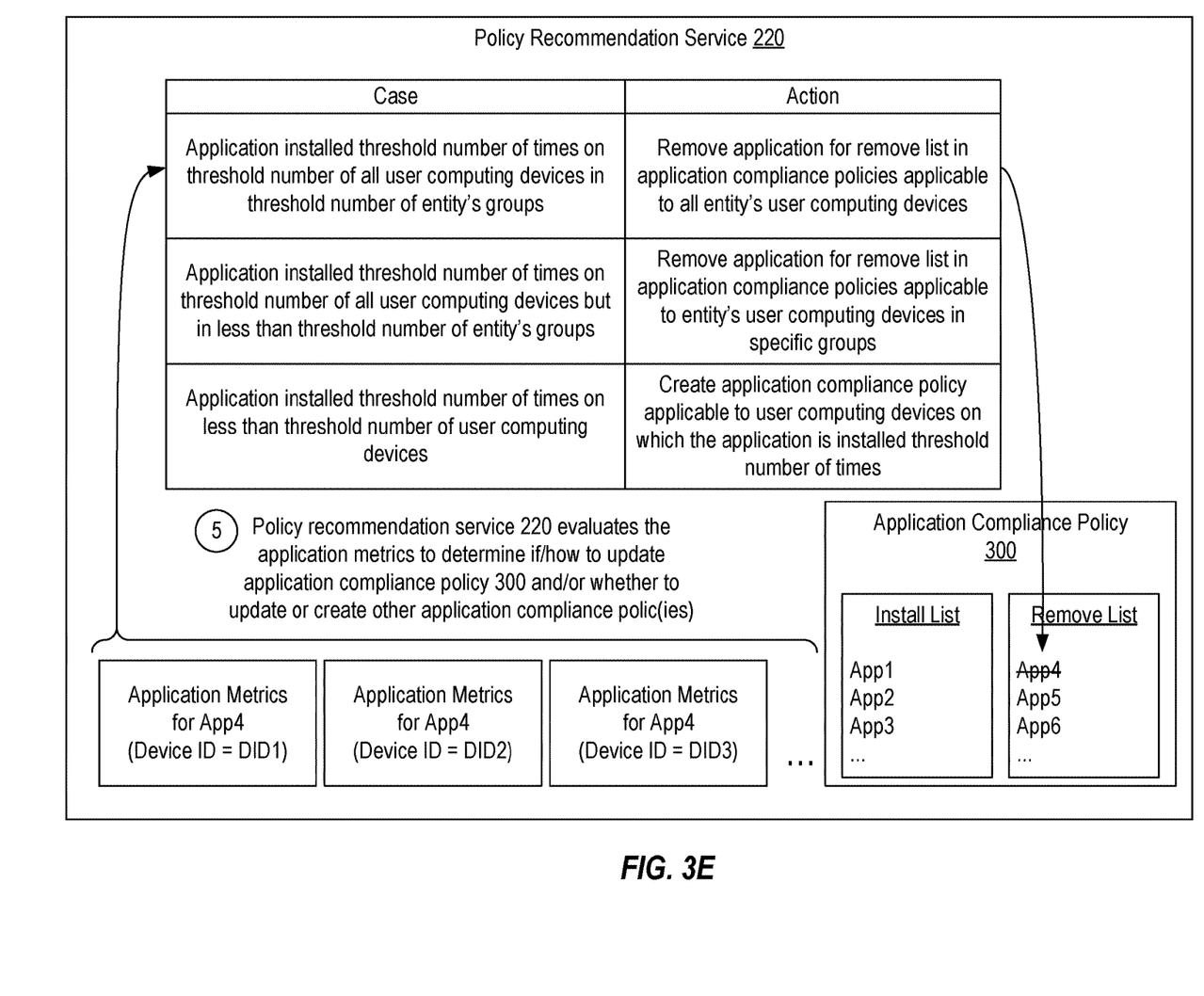

Turning to FIG. 3E, in step 5, policy recommendation service 220 can evaluate the application metrics for app4 to determine if/how to update application compliance policy 300 and/or whether to update or create any application compliance policies. As part of step 5, policy recommendation service 220 can evaluate the application metrics to determine if app4 is safe, compatible, reliable, vulnerable, etc. For example, before determining that an application compliance policy should be updated or created based on the application metrics for app4, policy recommendation service 220 can determine whether the application metrics indicate that app4 is trusted (such as by validating its digital signature) and/or whether app 4 routinely crashes on some or all of the reporting user computing devices 100, creates vulnerabilities on some or all of the reporting user computing devices 100, has compatibility issues on some or all of the reporting computing devices, etc.

If policy recommendation service 220 determines from the application metrics that there is no reason to maintain app4 in the remove list on at least one application compliance policy, policy recommendation service 220 can then identify one or more recommendations for removing and/or not including app4 on the remove list of an application compliance policy.

FIG. 3E provides three examples of how policy recommendation service 220 could determine a recommendation based on application metrics reported for an application. In a case where the application metrics indicate that users have installed the application a threshold number of times on a threshold number of all user computing devices and in a threshold number of an entity's groups, policy recommendation service 220 can recommend that the application be removed from each application compliance policy applicable to the entity's user computing devices. As an example, if user computing devices 100 represent 1000 of an entity's user computing devices and are used by users in 10 different groups and the application metrics reported for app4 indicate that app4 has been installed at least 10 times on at least 500 of user computing devices 100 spanning at least 5 of the 10 groups, policy recommendation service 220 could determine that removal of app4 should be recommended on a global level.

In a case where the application metrics indicate that users have installed the application a threshold number of times on a threshold number of all user computing devices but in less than a threshold number of an entity's groups, policy recommendation service 220 can recommend that the application be removed from any application compliance policy that is applicable only to the entity's user computing devices in particular groups, which in this case could be the groups where user computing devices have reported installation of the application the threshold number of times. As an example, if user computing devices 100 represent 1000 of an entity's user computing devices and are used by users in 10 different groups and the application metrics reported for app4 indicate that app4 has been installed at least 10 times on at least 500 of user computing devices 100 but these 500 user computing devices are only in 4 of the 10 groups, policy recommendation service 220 could determine that removal of app4 should be recommended for any application compliance policy applicable to user computing devices in those 4 groups.

In a case where the application metrics indicate that users have installed the application a threshold number of times on less than a threshold number of all user computing devices, policy recommendation service 220 can recommend that the application be removed from any application compliance policy that is applicable only to the user computing devices on which the application has been installed the threshold number of times. As an example, if user computing devices 100 represent 1000 of an entity's user computing devices and the application metrics reported for app4 indicate that app4 has been installed at least 10 times on 200 of user computing devices 100, policy recommendation service 220 could determine that removal of app4 should be recommended for any application compliance policy applicable to those 200 user computing devices.

Notably, policy recommendation service 220 can revise or change its recommendations over time as it continues to receive application metrics for a particular application. For example, policy recommendation service 220 could initially recommend removing app4 from a remove list (or not including it in a remove list) in any application compliance policy applicable to user computing devices 100 on which the user has installed app4 the threshold number of times and subsequently recommend removing app4 from the remove list in all application compliance policy once it is determined that a majority of users have repeatedly installed app4 on their user computing devices.

Also, policy recommendation service 220 can base its recommendations on other application metrics such as usage pattern and compatibility. For example, policy recommendation service 220 could recommend creating a new application compliance policy that does not include app4 in the remove list for a group of user computing devices because the users in the group use app4 for business purposes, whereas policy recommendation service 220 may forego recommending removal of app4 from the remove list of an application compliance policy applicable to other groups because users in the other groups do not use app4 for business purposes even though they frequently install it. As another example, policy recommendation service 220 could recommend removing app4 from the remove list of an applicable application compliance policy only for a particular time period in response to determining from the usage patterns in the application metrics that a majority of users only use app4 during the particular time period.

Figure 3F:
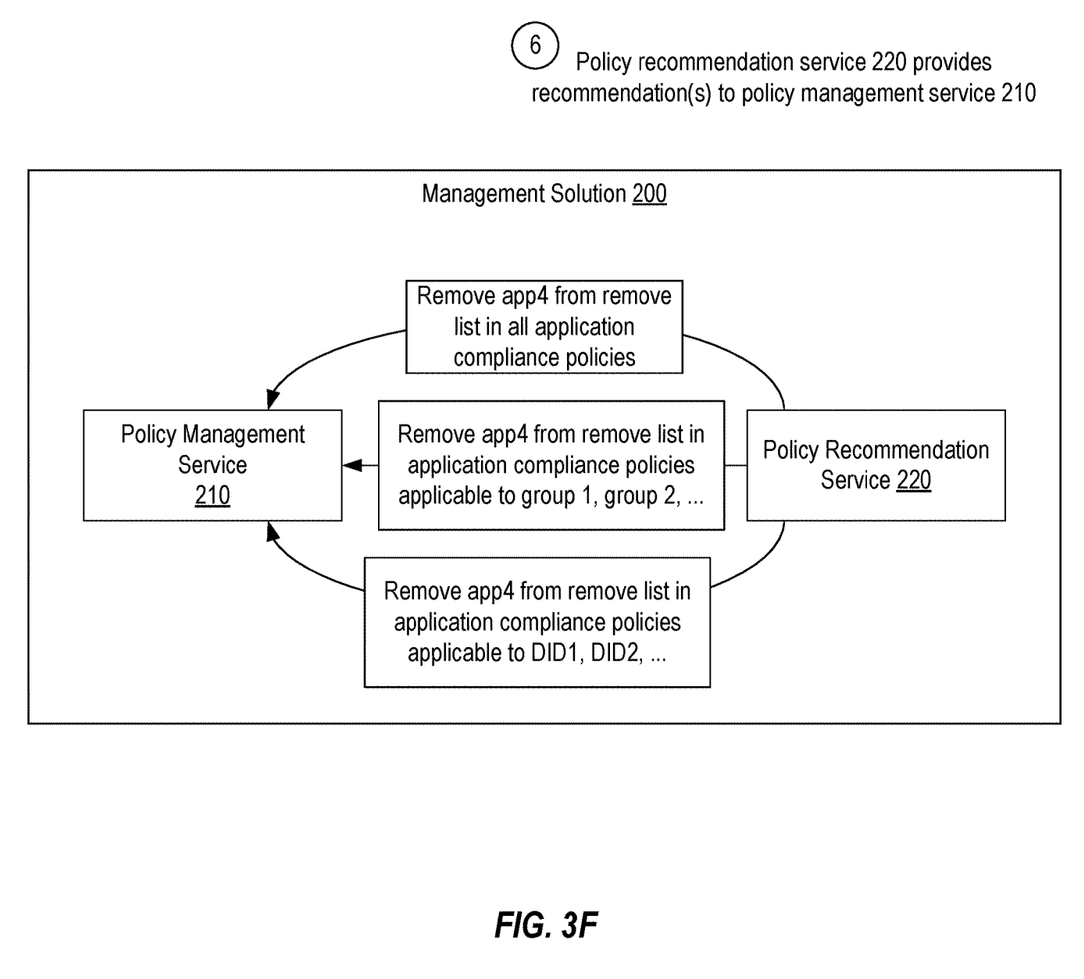

Turning to FIG. 3F, in step 6, policy recommendation service 220 can provide its recommendation(s) to policy management service 210. For example, policy recommendation service 220 could recommend removing app4 from (or not including it in) the remove list of all application compliance policies, of any application compliance policy applicable to particular groups of user computing devices, and/or of any application compliance policy applicable to particular user computing devices.

Figure 3G:
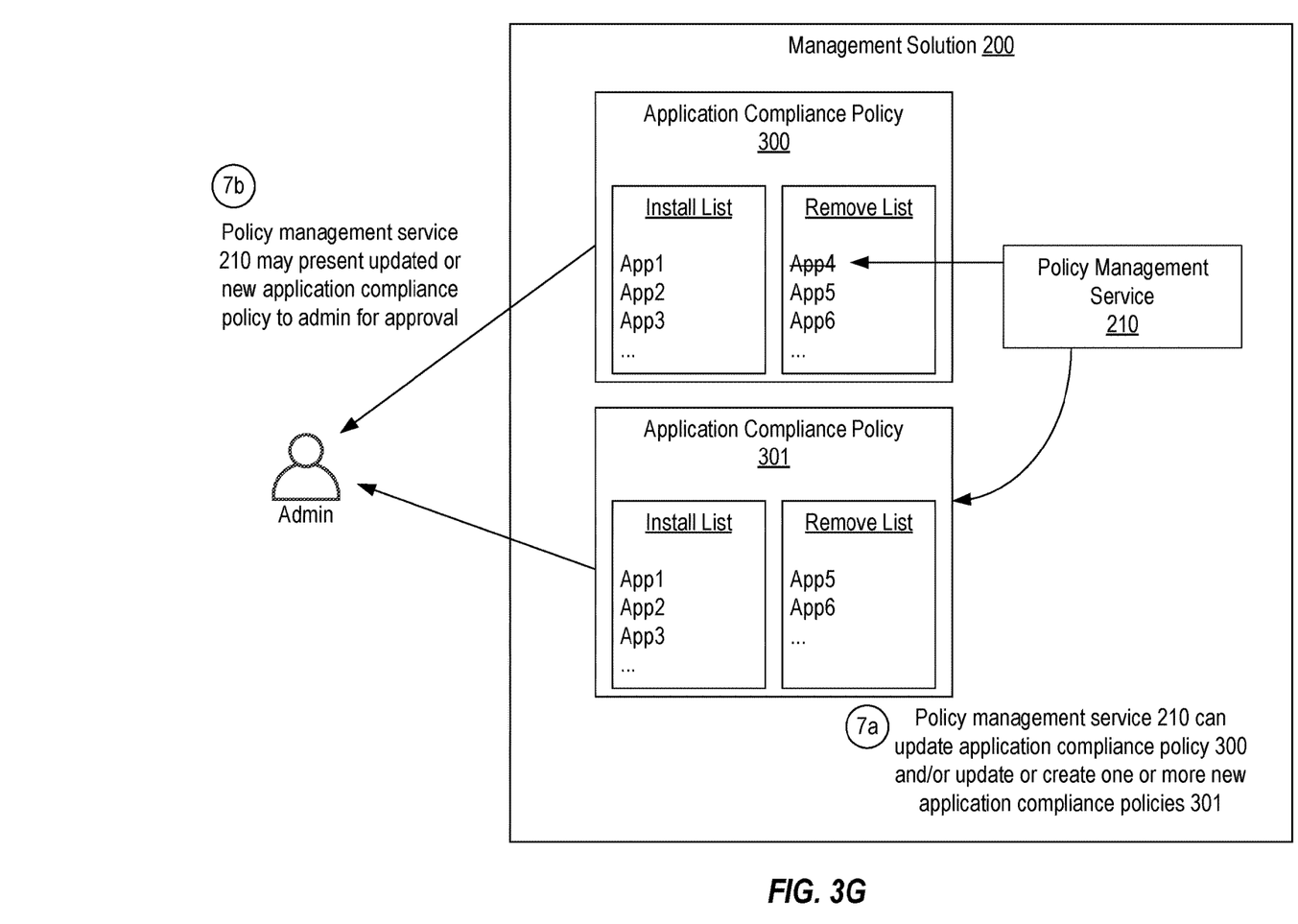

Turning to FIG. 3G, in step 7a, policy management service 210 can update application compliance policy 300 and/or create or update one or more other application compliance policies 301 based on the recommendation(s) from policy recommendation service 220. In step 7b, policy management service 210 could present any updated or new application compliance policy to an administrator for approval. However, in some embodiments, policy management service 210 could automatically update or create an application compliance policy (e.g., if app4 is widely installed and known to be safe). In some embodiments, policy management service 210 may even add an application to the install list in addition to removing it from the remove list (e.g., when the user of most or all of user computing devices 100 in one or more groups have installed it).

Figure 3H:
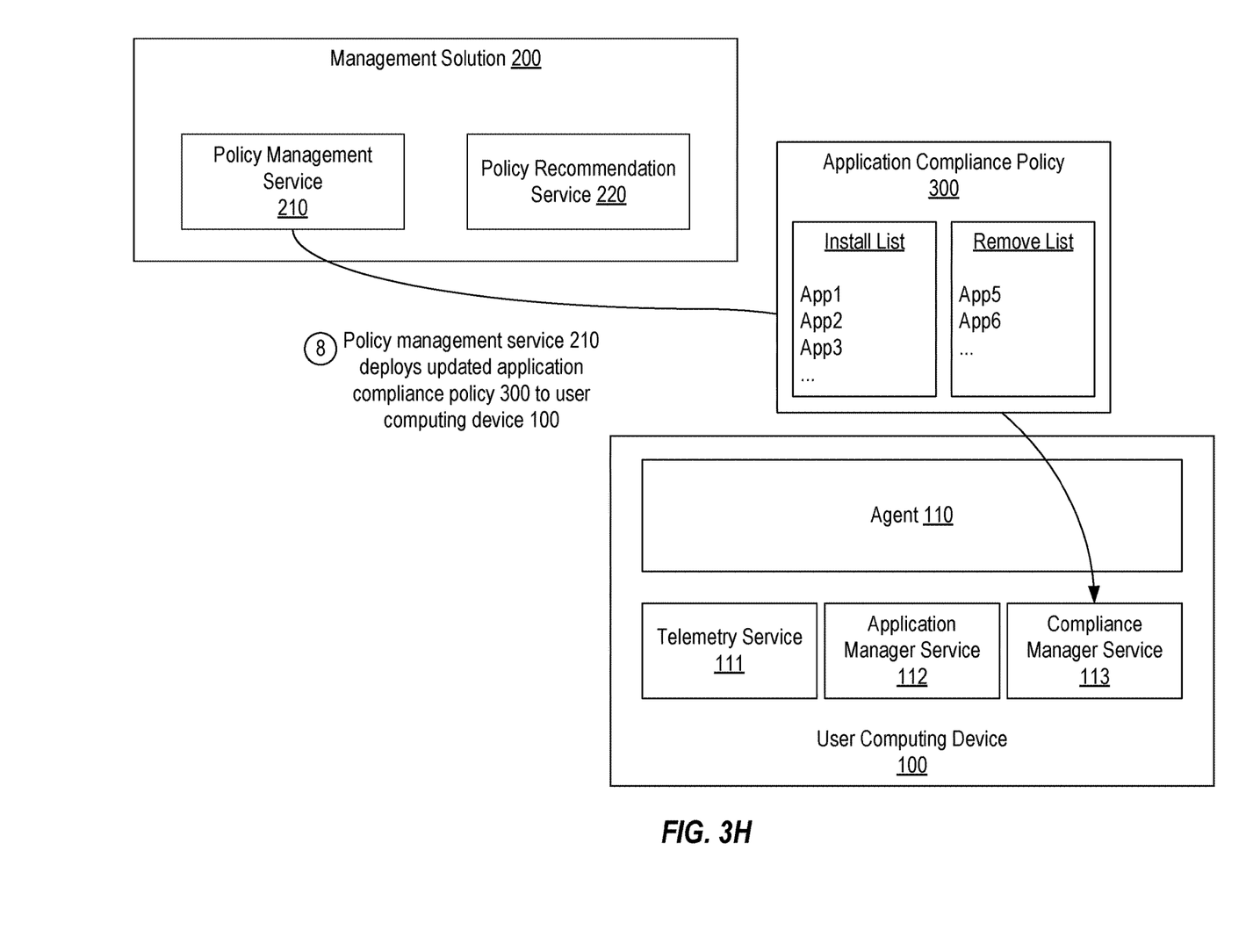

Finally, turning to FIG. 3H, in step 8, policy management service 210 can deploy updated application compliance policy 300 (or a new or other updated application compliance policy 301) to any applicable user computing device 100. For example, if application compliance policy 300 is globally applicable, each user computing device 300 can receive updated application compliance policy 300 to thereby prevent app4 from being removed on any of user computing devices 300 after a user installs it.

In summary, embodiments of the present invention enable application compliance policies to be updated or created dynamically based on application metrics reported from user computing devices on which applications are frequently installed. As a result, an administrator can ensure that the application compliance policies most accurately reflect how users use applications on their managed user computing devices while maintaining control over compliance.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for dynamically updating application compliance policies comprising:
   tracking, on a first user computing device, a number of times a user has installed an application on the first user computing device;
   in response to the tracking, determining that the user has installed the application a threshold number of times;
   sending application metrics to a policy recommendation service, the application metrics indicating that the user installed the application on the first user computing device the threshold number of times;
   generating, by the policy recommendation service, a recommendation to exclude the application from a remove list of an application compliance policy based on the application metrics received from the first user computing device; and
   in response to the recommendation, deploying the application compliance policy that excludes the application from the remove list to the first user computing device to thereby prevent removal of the application from the first user computing device when the user installs the application.

2. The method of claim 1, wherein tracking the number of times the user has installed the application on the first user computing device includes determining that the application is included in a remove list of an application compliance policy that is applicable to the first user computing device during the tracking.

3. The method of claim 1, wherein the application metrics include one or more of a digital signature of the application, crash information for the application, compatibility information for the application, or vulnerability information for the application.

4. The method of claim 1, wherein the recommendation is generated based also on application metrics for the application received from one or more other user computing devices on which respective users installed the application the threshold number of times.

5. The method of claim 4, wherein the recommendation to exclude the application from the remove list of the application compliance policy comprises a recommendation to exclude the application from a remove list of an application compliance policy that is applicable to all managed user computing devices.

6. The method of claim 5, wherein the recommendation is generated in response to determining that application metrics received from a plurality of the managed user computing devices indicate that the application was installed the threshold number of times on a threshold number of the managed user computing devices in a threshold number of groups of the managed user computing devices.

7. The method of claim 4, wherein the recommendation to exclude the application from the remove list of the application compliance policy comprises a recommendation to exclude the application from a remove list of an application compliance policy that is applicable to a subset of groups of managed user computing devices.

8. The method of claim 7, wherein the recommendation is generated in response to determining that application metrics received from a plurality of the managed user computing devices indicate that the application was installed the threshold number of times on a threshold number of the managed user computing devices in less than a threshold number of groups of the managed user computing devices.

9. The method of claim 8, wherein the subset of groups of the managed user computing devices excludes groups that do not include a user computing device on which the respective user installed application the threshold number of times.

10. The method of claim 1, further comprising:
presenting the recommendation to an administrator for approval prior to deploying the application compliance policy.

11. The method of claim 1, wherein the application compliance policy that excludes the application from the remove list is an application compliance policy having a remove list from which the application was removed.

12. The method of claim 1, wherein the application compliance policy that excludes the application from the remove list is an application compliance policy created in response to the recommendation.

13. The method of claim 1, wherein the application compliance policy is deployed automatically in response to the recommendation.

14. One or more computer storage media storing computer executable instructions which when executed implement a method for dynamically updating application compliance policies comprising:
receiving, at a policy recommendation service, application metrics from a plurality of user computing devices, the application metrics indicating that an application has been installed a threshold number of times on the plurality of user computing devices;
evaluating the application metrics received from the plurality of user computing devices to generate a recommendation to remove the application from a remove list of an application compliance policy;
based on the recommendation, updating the application compliance policy to remove the application from the remove list; and
deploying the updated application compliance policy to at least some of the plurality of user computing devices to thereby prevent the application from being removed from the at least some of the plurality of user computing devices.

15. The computer storage media of claim 14, wherein evaluating the application metrics received from the plurality of user computing devices comprises determining that the application has been installed the threshold number of times on a threshold number of the plurality of user computing devices.

16. The computer storage media of claim 14, wherein the method further comprises:
based on the recommendation, updating or creating one or more other application compliance policies to exclude the application from a remove list.

17. The computer storage media of claim 14, wherein the application metrics include one or more of a digital signature of the application, crash information for the application, compatibility information for the application, or vulnerability information for the application on which the recommendation is based.

18. A system comprising:
a management solution having a policy management service and a policy recommendation service; and
a plurality of user computing devices having a telemetry service;
wherein the telemetry service is configured to:
track a number of times a user has installed an application on the respective user computing device to determine that the user has installed the application a threshold number of times; and
send application metrics to the policy recommendation service indicating that the user installed the application the threshold number of times;
wherein the policy recommendation service is configured to:
generate a recommendation to exclude the application from a remove list of an application compliance policy based on the application metrics received from the telemetry service on the plurality of user computing devices; and
wherein the policy management service is configured to:
deploy the application compliance policy that excludes the application from the remove list to one or more of the user computing devices to thereby prevent removal of the application from the one or more user computing devices when the respective user installs the application.

19. The system of claim 18, wherein the policy recommendation service generates the recommendation in response to determining that the application metrics indicate that the application was installed the threshold number of times on a threshold number of the user computing devices in a threshold number of groups of the user computing devices; and
wherein the application compliance policy is deployed to all the user computing devices.

20. The system of claim 18, wherein the policy recommendation service generates the recommendation in response to determining that the application metrics indicate that the application was installed the threshold number of times on a threshold number of the user computing devices in less than a threshold number of groups of the user computing devices; and
    wherein the application compliance policy is deployed to a subset of groups of the user computing devices.

\* \* \* \* \*